(No Model.) 3 Sheets—Sheet 1.
J. F. AMES.
APPARATUS FOR BEATING OR PRESSING OUT WELTS ABOUT TOES OF BOOTS OR SHOES.
No. 559,115. Patented Apr. 28, 1896.
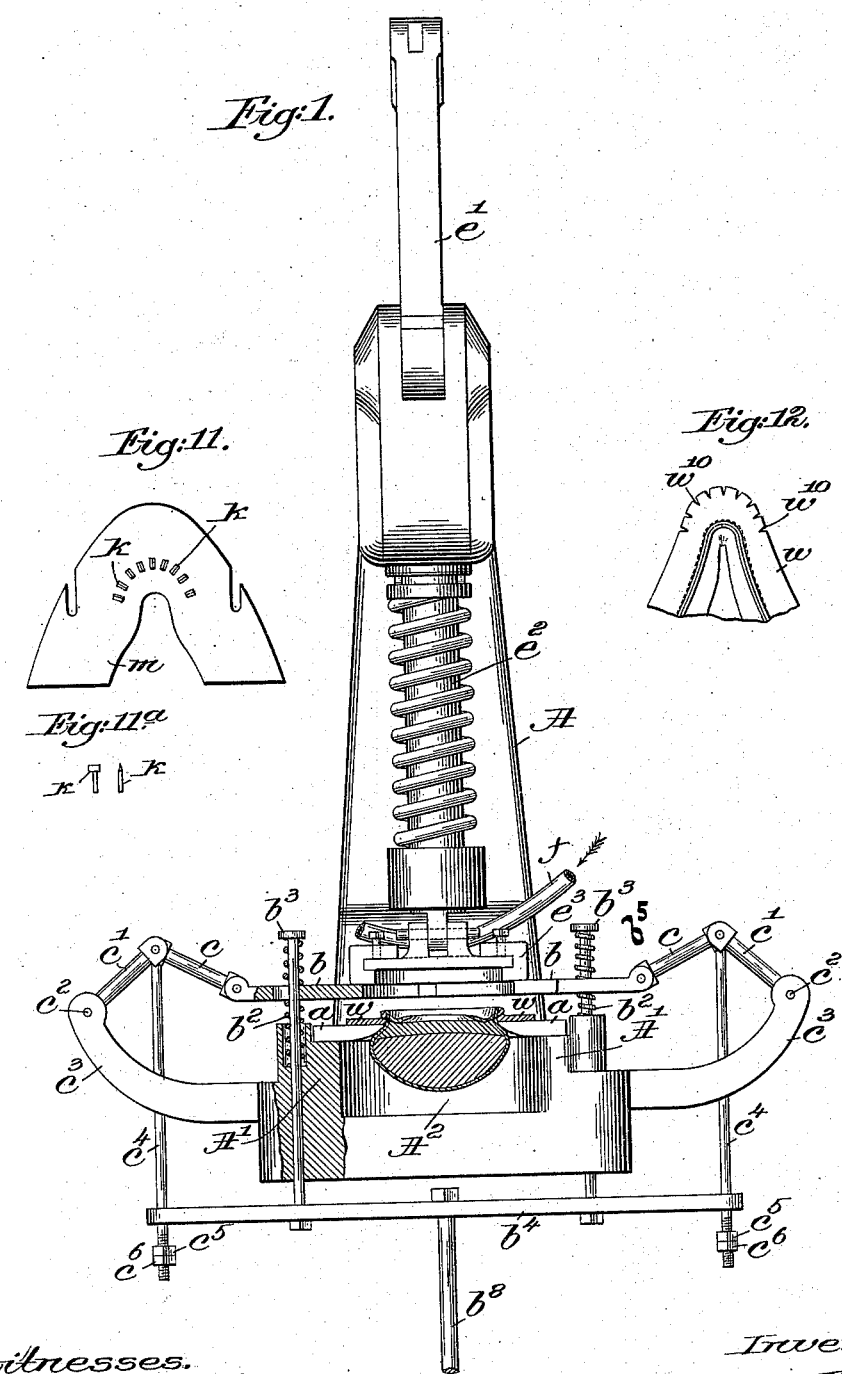

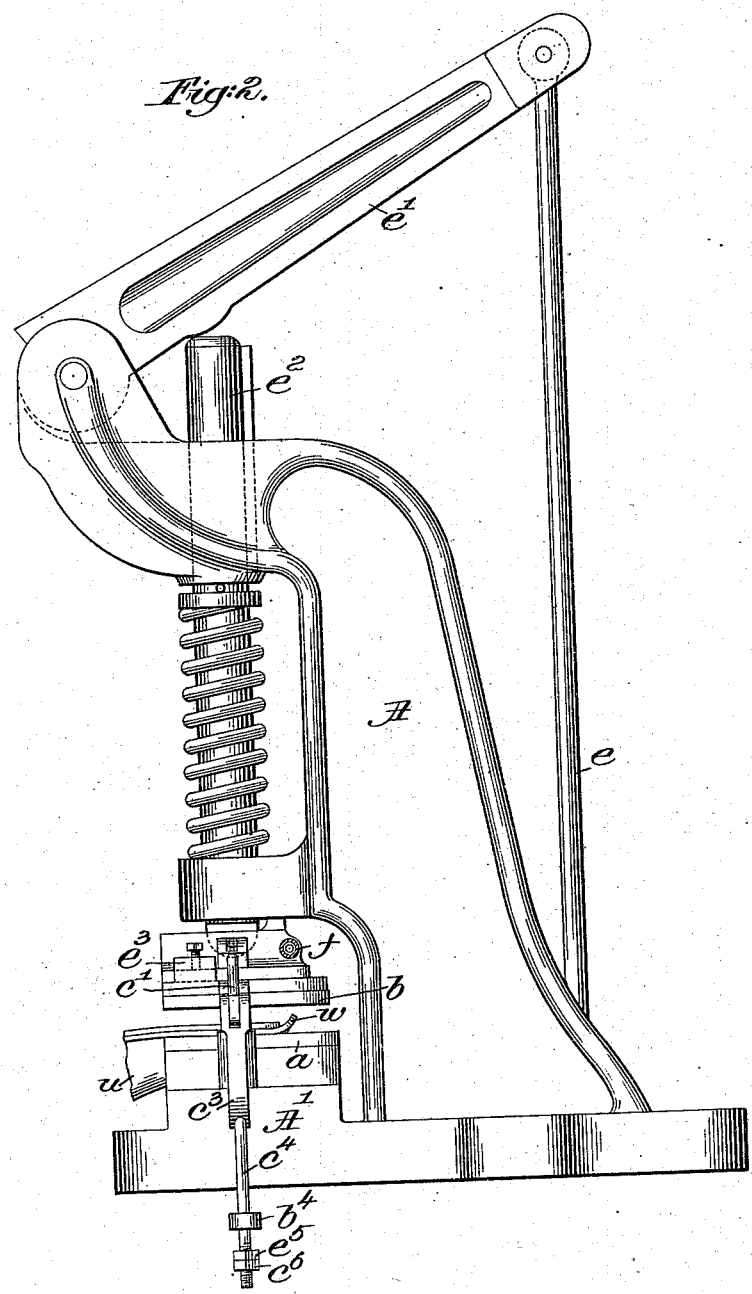

(No Model.) 3 Sheets—Sheet 3.
J. F. AMES.
APPARATUS FOR BEATING OR PRESSING OUT WELTS ABOUT TOES OF BOOTS OR SHOES.
No. 559,115. Patented Apr. 28, 1896.
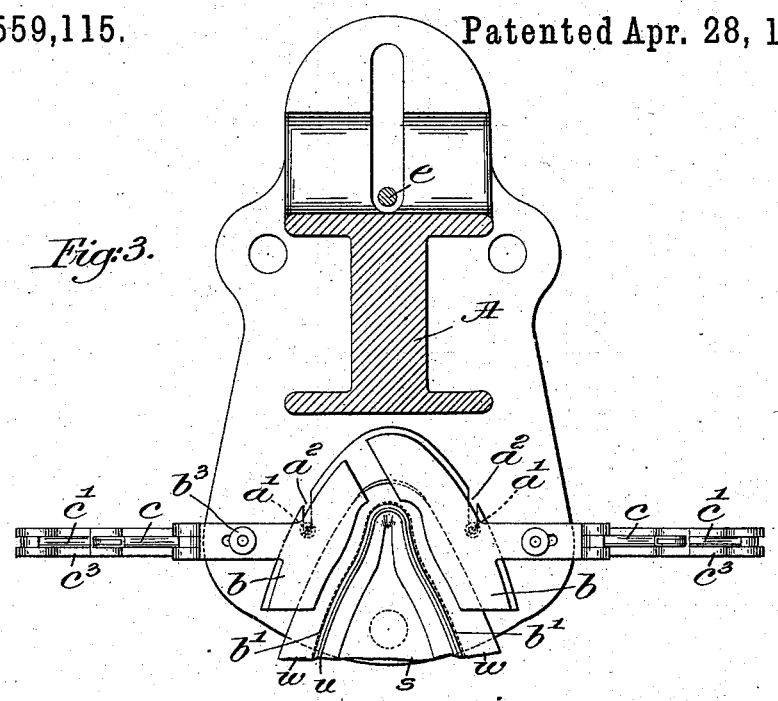
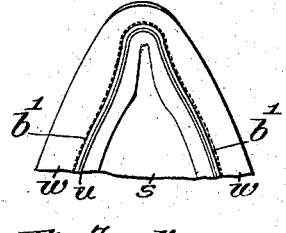
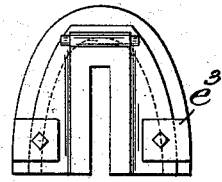
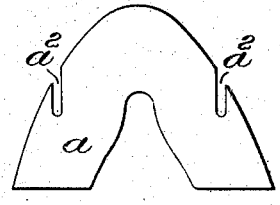
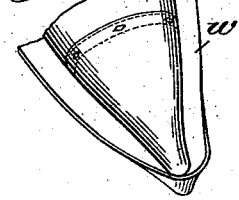
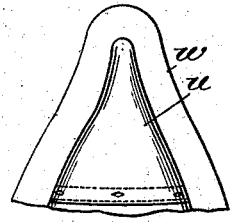
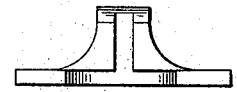
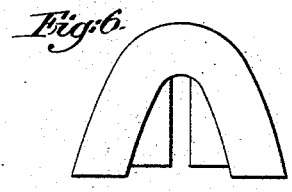
Witnesses.
Fred S. Greenleaf.
Thomas F. Drummond.
Inventor.
Joshua F. Ames.
By Crosby Gregory,
attys.

UNITED STATES PATENT OFFICE.

JOSHUA F. AMES, OF ROCKLAND, MASSACHUSETTS.

APPARATUS FOR BEATING OR PRESSING OUT WELTS ABOUT TOES OF BOOTS OR SHOES.

SPECIFICATION forming part of Letters Patent No. 559,115, dated April 28, 1896.

Application filed January 16, 1896. Serial No. 575,718. (No model.)

*To all whom it may concern:*

Be it known that I, JOSHUA F. AMES, of Rockland, county of Plymouth, State of Massachusetts, have invented an Improvement in Apparatus for Beating or Pressing Out Welts about the Toes of Boots or Shoes, of which the following description, in connection with the accompanying drawings, is a specification, like letters on the drawings representing like parts.

Many shoes at the present time have their toes rather sharply pointed, and much difficulty is experienced after the welts are attached to the uppers and inner soles to beat or press out flat the welts preparatory to uniting the outer sole to the welt. I have devised apparatus for performing this work, and said apparatus will be hereinafter more fully described.

My apparatus in its simplest form contains a rest-plate adapted to enter the space in and about the junction of the welt and upper and support the welt and a pressure device to descend on the welt sustained on said rest, said pressure device being preferably heated and also preferably so pivoted to adapt itself to the thickness of the welt, the pressure and heat resulting in shaping the welt and laying it out flat ready to receive the outer sole upon it to be attached by stitches through the welt and sole.

I prefer that the parts referred to be accompanied with pressure-plates having their inner edges shaped to conform to the outline of the toe at the junction of the welt to the upper, so that said pressure-plates, after the shoe has been put in position to place the welt on the rest, may be slid over the welt lying on the rest until the edges of the plate contact with the welt next the line of stitches joining it to the upper and between substance of the sole, and thereafter the pressure device will descend and squeeze, beat out and iron, and flatten the welt, the edges of the pressure-plates preventing the toe from being distorted by pressure.

When the pressure-plates are used, the pressure device may act on the top of the pressure-plates.

Figure 1, in front elevation, represents an apparatus embodying my invention in one form; Fig. 2, a side elevation of the same; Fig. 3, a section in the line $x$, Fig. 1. Fig. 4 shows the pressure device detached; Figs. 5 and 6, views of a modified form of pressure device. Figs. 7 and 8 show a shoe with the welt attached to it, as it will appear after the stitching and before beating or laying it out. Fig. 9 shows the welt beat or laid out. Fig. 10 shows the rest detached. Fig. 11 is a modified form of rest detached, to be described. Fig. 11$^a$ shows in side and end elevation one of the knives or cutters for use with the modified form of rest, and Fig. 12 is an under side view of the welt beat or laid out by the modified form of rest shown in Fig. 11.

The framework A is and may be of any suitable shape to sustain the working parts to be described.

The framework has a raised lip A' to leave a toe-receiving space A², and this lip sustains a rest $a$, (shown as a metallic plate,) which is suitably attached to the rest. The inner edges of the rest (see Fig. 10) are made to conform to the shape of the toe of the last of whatever form, and that these plates may be readily taken off and others applied, having their inner edge of the desired shape, I prefer to attach them by screws, (see dotted lines $a'$, Fig. 3,) which screws may be loosened and permit the rest by reason of the slots $a^2$ to be readily drawn off and another supplied; but this invention is not limited to any particular manner of connecting the rest to the framework, so that it may be readily and quickly changed for another rest of different shape. The toe of the last with the upper thereon is pushed into the space A² with the welt $w$ on top of the rest, the inner beveled edge of the rest entering closely into the space or junction of the welt with the upper. This done, the welt must be beaten out or pressed flat into the condition shown in Fig. 9. To do this, I prefer to provide the machine with two pressure-plates $b\ b$, the inner edges of which are shaped to conform with the shape of the toe of the last and to contact with the welt at the then upper side (see Fig. 3) on the line of the seam $b'$, joining the welt to the upper $u$ and the raised between substance of the sole $s$. These plates normally stand somewhat above the rest $a$, and are herein shown as supported by springs $b^2$ on guides $b^3$, shown as attached to a movable frame or yoke $b^4$, the upper ends of the guides having heads, and between said heads and the upper sides of the plates $b$ I have shown other springs $b^5$. The holes in the shanks of the plates $b$ are larger than the guides $b^3$, so that the plates may also slide horizontally on the guides.

To slide the plates horizontally, I have herein shown the shank of each plate connected to a suitable toggle device $c\ c'$, the outer member $c'$ of the toggle being jointed at $c^2$ on suitable arms $c^3$, shown as extended from the framework, the junction of the members $c\ c'$, having attached to them links $c^4$, having at its under side an adjustable stop $c^5$, which may be held by a nut $c^6$. The springs $b^2$ act normally to keep the plates $b$ elevated, as in Figs. 1 to 3.

The yoke $b^4$ has an attached rod $b^8$ under the control of the foot of the operator, and the shoe being in the position Fig. 2 the yoke is depressed until the under sides of the pressure-plates come upon the then upper side of the welt, and by that time the yoke meets the stops $c^5\ c^5$, which may be adjusted and placed at the proper position on the links $c^4$, and the further depression of the yoke straightens the toggle and slides the pressure-plates toward each other until their inner edges come to proper position with relation to the line of stitching referred to, when the operator will, as herein shown, by or through the rod $e$, turn the lever $e'$, depress the carrier $e^2$, and cause the lower side of the metallic pressure device $e^3$ to descend on the plates $b$ and press them firmly and hard down onto the welt, thus squeezing, beating out, and laying the said welt flat, so that it will extend horizontally from the upper about the toe and be in proper position to have the outer sole laid on it to be stitched thereto close to the junction of the welt with the upper. The pressure device to do this work in the best manner will be heated, and it will transmit its heat to the welt through the plates $b$.

The pressure device may be heated by steam coming into it through a pipe $f$ supplied from any suitable source for the production of steam.

The pressure device (shown separately in Fig. 4) is represented as composed of two parts—viz, a center portion adapted to be pivoted to the carrier $e^2$, and a detachable U-shaped piece, it conforming in shape substantially to the shape of the welt about the toe of the particular shoe being acted upon, the said U-shaped piece having ears to overlap (see Fig. 1) the edge of the central piece, screws in the ears acting in the central piece to keep the U-shaped piece in place, yet permit it to be readily changed for one of another shape when the shape of the toe of the shoe requires.

I have shown one simple manner of working these pressure-plates; but this invention is not limited to the particular manner shown for operating them, and I may employ any other well-known or suitable actuating devices for the purpose, and so also this invention is not limited in all instances to the use of the said plates, for, while they are very desirable, the welt may be beaten out and laid flat by permitting the heated pressure device to descend on the welt laid on the rest; but then in some instances the pressure on the welt and shoe in pressing the welt out flat produces sufficient strain on the seam at the junction of the welt with the upper and between substance to strain the seam out of true line of conformity with the toe of the last, such stretching somewhat interfering with the trueness of the seam subsequently to be put in to join the welt to the outer sole.

I have shown the pressure device as mounted on a carrier made as a sliding rod, but this invention is not limited to the particular shape of the carrier or the devices for moving it, so long as it has a movement toward and from the rest $a$ at the proper times.

In Figs. 5 and 6 I have shown a modified form of pressure device, wherein the central portion and the U-shaped acting face are integral.

In Fig. 11 I have shown a modified form of rest $m$, similar in shape to the rest $a$, but provided with a series of preferably removable knives $k$, (see Fig. 11$^a$,) suitably inserted in the rest and projecting from its upper surface about the toe portion thereof.

When the welt is under pressure, the knives $k$ will cut into or notch its edge about the toe, as at $w^{10}$, Fig. 12, to ease the strain on the edge of and assist in flattening the welt.

I believe I am the first to devise apparatus to perform the work herein referred to, and my apparatus may easily be changed or adapted to have the pressure-plates and pressure device moved automatically in the order named with the exercise of only mechanical skill without the exercise of invention.

Having described my invention, what I claim, and desire to secure by Letters Patent, is—

1. In a machine for beating or laying out the welts about the toes of boots or shoes, a removable rest to sustain the welt about the toe and contact with the upper at the junction of the welt and upper, and a pressure device coöperating therewith to press the welt flat on the rest, substantially as described.

2. In a machine for beating or laying out the welts about the toes of boots or shoes, a rest to sustain the welt said rest having an extended edge to enter between the upper and the welt and to contact with the upper at the junction of the welt and upper, and a heated pressure device coöperating therewith to press the welt flat on the rest, substantially as described.

3. In a machine for beating or laying out the welts about the toes of boots or shoes, a rest to sustain the welt and contact with the upper at the junction of the welt and upper, and separable pressure-plates to bear on the side of the welt opposite the rest and hold the welt in line with the stitching joining the welt to the upper, substantially as described.

4. In a machine for beating or laying out the welts about the toes of boots or shoes, a rest to sustain the welt and contact with the upper at the junction of the welt and upper, and a heated pressure device coöperating therewith to press the welt flat on the rest, and pressure-plates to slide over the welt lying on the rest, the acting edges of said plates conforming substantially to the shape of the last, substantially as described.

5. A movable carrier, and its attached pressure device composed of a central heated portion and a detachable U-shaped face, combined with the rest having its inner edge shaped to conform substantially to the shape of the toe of the last, substantially as described.

6. In an apparatus for beating or laying out the welts about the toes of boots or shoes, a rest to sustain the welt, a series of cutters to slit or notch the edge of the welt about the toe, and a coöperating pressure device to press the welt flat on the rest, substantially as described.

7. A movable carrier, and its attached pressure device having a U-shaped face, combined with the rest having its inner edge shaped to enter between the upper and the welt, and to contact with the upper at the junction of the welt and upper, substantially as described.

8. In a machine for beating or laying out the welts about the toes of boots and shoes, a rest shaped to surround the toe, enter the space between the welt and upper, and support said welt about said toe, a pressure-plate to bear on the welt above said support, and a pressure device adapted to be forced down onto the said pressure-plate to firmly press and lay out the welt, substantially as described.

9. In a machine for beating or laying out the welts about the toes of boots and shoes, a rest shaped to surround the toe, enter the space between the welt and upper, and support said welt about said toe, a pressure-plate to bear on the welt above said support, and a heated pressure device adapted to be forced down onto the said pressure-plate to firmly press and lay out the welt, substantially as described.

10. In a machine for beating or laying out the welts about the toes of boots and shoes, a rest shaped to surround the toe, enter the space between the welt and upper, and support said welt about said toe, a pressure-plate to bear on the welt above said support, said pressure-plate having its inner edge shaped to conform to the toe of the last and lying, when in operative position, closely adjacent to the line of stitches joining the welt to the upper, and a pressure device adapted to be forced down onto the said pressure-plate to firmly press and lay out the welt, substantially as described.

In testimony whereof I have signed my name to this specification in the presence of two subscribing witnesses.

JOSHUA F. AMES.

Witnesses:
GEO. W. GREGORY,
JOHN C. EDWARDS.